US012658831B2

(12) United States Patent
Fountain et al.

(10) Patent No.: US 12,658,831 B2
(45) Date of Patent: Jun. 16, 2026

(54) REMOTE CONTROL GENERATOR

(71) Applicant: ASF Technologies (Australia) Pty Ltd, Sydney (AU)

(72) Inventors: Graham Harry Fountain, Sydney (AU); Emmanuel Kavarnos, Sydney (AU); Dimitrios Psonis, Sydney (AU); Richard Terrence Tamba, Sydney (AU)

(73) Assignee: ASF Technologies (Australia) Pty Ltd, Sydney (AU)

( * ) Notice: Subject to any disclaimer, the term of this patent is extended or adjusted under 35 U.S.C. 154(b) by 0 days.

(21) Appl. No.: 18/692,798

(22) PCT Filed: Sep. 16, 2022

(86) PCT No.: PCT/AU2022/051119
§ 371 (c)(1),
(2) Date: Mar. 15, 2024

(87) PCT Pub. No.: WO2023/039637
PCT Pub. Date: Mar. 23, 2023

(65) Prior Publication Data
US 2024/0380344 A1      Nov. 14, 2024

(30) Foreign Application Priority Data
Sep. 17, 2021    (AU) ................................ 2021903001

(51) Int. Cl.
*G06F 8/65*      (2018.01)
*F02B 63/04*      (2006.01)
(Continued)

(52) U.S. Cl.
CPC .............. *H02P 9/04* (2013.01); *F02B 63/042* (2013.01); *G06F 8/65* (2013.01); *G06Q 30/0645* (2013.01); *G08C 17/02* (2013.01); *H02J 3/38* (2013.01)

(58) Field of Classification Search
CPC .......... H02P 9/04; H02P 2101/25; H02P 9/00; F02B 63/042; F02B 75/246; F02B 63/04; (Continued)

(56) References Cited

U.S. PATENT DOCUMENTS

| | | | |
|---|---|---|---|
| 5,642,713 A | * | 7/1997 Schmitz .............. | F02D 41/0052 |
| | | | 123/435 |
| 6,392,312 B1 | | 5/2002 Morris | |

(Continued)

FOREIGN PATENT DOCUMENTS

| | | |
|---|---|---|
| EP | 1699140 A1 | 9/2006 |
| EP | 3421166 A1 | 1/2019 |

(Continued)

OTHER PUBLICATIONS

Nov. 16, 2022—International Search Report—Intl App PCT/AU2022/051119.

(Continued)

*Primary Examiner* — Pedro J Cuevas
(74) *Attorney, Agent, or Firm* — Banner & Witcoff, Ltd.

(57) ABSTRACT

A generator for providing electrical power, the generator being provided with a control unit for controlling the generator, wherein the generator includes a communication receiver such that the generator is able to be remotely controlled by instructions received by way of the communication receiver. A method of supplying electrical power including the steps of: providing a plurality of generators rated at a first capacity but restricted to a second capacity, the second capacity being lower than the first capacity; leasing (Continued)

the generators to customers at a lease rate commensurate with the second capacity; on approval from the customers, selectively remotely derestricting the generators to operate at the first capacity and at a lease rate commensurate with the first capacity.

18 Claims, 3 Drawing Sheets

(51) Int. Cl.
| | | |
|---|---|---|
| *G06Q 30/0645* | (2023.01) | |
| *G08C 17/02* | (2006.01) | |
| *H02J 3/38* | (2026.01) | |
| *H02P 9/04* | (2006.01) | |

(58) Field of Classification Search
CPC .... G06Q 30/0645; G06Q 50/06; G08C 17/02; G08C 2201/42; G08C 2201/50; H02J 3/38; H02J 3/008; H04Q 9/00; H04Q 2209/40
See application file for complete search history.

(56) References Cited

U.S. PATENT DOCUMENTS

| | | | | |
|---|---|---|---|---|
| 6,925,971 B1 * | 8/2005 | Peng | | F02B 71/04 |
| | | | | 123/46 R |
| 6,941,904 B1 * | 9/2005 | Hofbauer | | F02B 71/00 |
| | | | | 417/364 |
| 6,948,459 B1 * | 9/2005 | Laumen | | F02B 71/04 |
| | | | | 123/46 R |
| 6,953,010 B1 * | 10/2005 | Hofbauer | | F02B 71/04 |
| | | | | 123/46 R |
| 6,957,632 B1 * | 10/2005 | Carlson | | F02B 37/00 |
| | | | | 123/46 B |
| 6,959,672 B1 * | 11/2005 | Peng | | F02M 69/045 |
| | | | | 123/46 B |
| 7,032,548 B2 * | 4/2006 | Tusinean | | F02B 71/045 |
| | | | | 123/46 R |
| 7,047,916 B2 * | 5/2006 | Pischinger | | F02B 71/00 |
| | | | | 123/46 B |
| 7,077,080 B2 * | 7/2006 | Schmuecker | | F02B 71/04 |
| | | | | 123/46 R |
| 7,194,989 B2 * | 3/2007 | Hallenbeck | | F02B 75/32 |
| | | | | 123/73 AB |
| 7,899,610 B2 * | 3/2011 | McClellan | | B60R 16/0236 |
| | | | | 701/115 |
| 7,931,005 B2 | 4/2011 | Lemke et al. | | |
| 9,027,346 B2 * | 5/2015 | Torkildsen | | F02B 75/32 |
| | | | | 60/622 |

| | | | | |
|---|---|---|---|---|
| 10,544,748 B2 * | 1/2020 | Dudar | | F02D 29/02 |
| 10,871,106 B2 * | 12/2020 | Roskilly | | F02G 1/0435 |
| 11,137,430 B1 * | 10/2021 | Tsironis | | G01R 27/06 |
| 11,462,059 B2 * | 10/2022 | Gray | | G07C 5/008 |
| 11,746,691 B2 * | 9/2023 | Famouri | | F01B 11/007 |
| | | | | 123/46 E |
| 11,847,868 B2 * | 12/2023 | Gray | | G07C 5/0825 |
| 2003/0224833 A1 | 12/2003 | Egan et al. | | |
| 2005/0257759 A1 * | 11/2005 | Pischinger | | F02B 71/00 |
| | | | | 123/46 R |
| 2005/0263114 A1 * | 12/2005 | Fuqua | | F02B 71/045 |
| | | | | 123/196 R |
| 2005/0284426 A1 * | 12/2005 | Tusinean | | F02B 71/045 |
| | | | | 123/46 R |
| 2006/0042575 A1 * | 3/2006 | Schmuecker | | F02B 71/04 |
| | | | | 123/46 R |
| 2006/0196456 A1 * | 9/2006 | Hallenbeck | | F02B 75/16 |
| | | | | 123/47 A |
| 2007/0013088 A1 * | 1/2007 | Robertson | | F02M 23/12 |
| | | | | 261/115 |
| 2008/0221776 A1 * | 9/2008 | McClellan | | B60R 16/0236 |
| | | | | 701/115 |
| 2010/0228404 A1 * | 9/2010 | Link, II | | G06F 9/44542 |
| | | | | 701/1 |
| 2011/0309053 A1 | 12/2011 | Baus | | |
| 2013/0186354 A1 * | 7/2013 | Torkildsen | | F01B 7/12 |
| | | | | 123/41.72 |
| 2014/0277791 A1 | 9/2014 | Lenard et al. | | |
| 2014/0318518 A1 | 10/2014 | Jeswine | | |
| 2017/0314475 A1 * | 11/2017 | Terry | | F02B 39/16 |
| 2017/0324145 A1 | 11/2017 | Janscha | | |
| 2018/0022340 A1 | 1/2018 | Hill et al. | | |
| 2019/0055884 A1 | 2/2019 | Derra et al. | | |
| 2019/0055898 A1 * | 2/2019 | Roskilly | | F02B 71/00 |
| 2019/0218988 A1 * | 7/2019 | Dudar | | F02D 27/02 |
| 2021/0241546 A1 * | 8/2021 | Chafekar | | G07C 5/0808 |
| 2022/0154634 A1 * | 5/2022 | Famouri | | F02B 71/04 |
| 2022/0270412 A1 * | 8/2022 | Gray | | F02D 41/345 |
| 2023/0029268 A1 * | 1/2023 | Gray | | F02D 41/26 |

FOREIGN PATENT DOCUMENTS

| | | | |
|---|---|---|---|
| KR | 20100009675 | U | 10/2010 |
| KR | 102011121 | B1 | 8/2019 |
| WO | 2001/061820 | A1 | 8/2001 |

OTHER PUBLICATIONS

Put your power generator online [Viewed on internet on Nov. 11, 2022] <URL: https://www.youtube.com/watch?v=TgP8q-71vOg >. Published on Apr. 11, 2017. Whole video, in particular see time stamp 00:15 to 00:50.

* cited by examiner

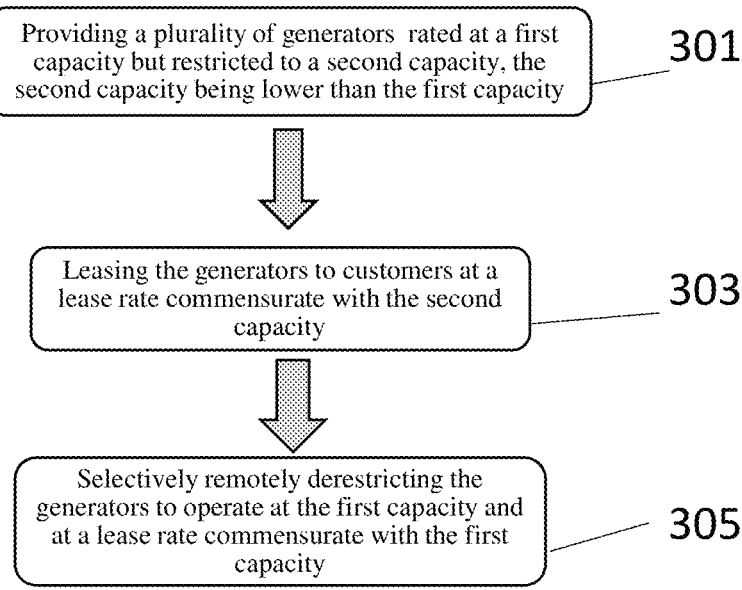

Providing a plurality of generators rated at a first capacity but restricted to a second capacity, the second capacity being lower than the first capacity    301

Leasing the generators to customers at a lease rate commensurate with the second capacity    303

Selectively remotely derestricting the generators to operate at the first capacity and at a lease rate commensurate with the first capacity    305

FIGURE 3

REMOTE CONTROL GENERATOR

CROSS-REFERENCE TO RELATED APPLICATIONS

This is a U.S. National Stage application under 35 U.S.C. § 371 of International Application No. PCT/AU2022/051119, filed Sep. 16, 2022, which claims priority to Australian Patent Application No. 2021903001, filed Sep. 17, 2021, which was published Under PCT Article 21 (2), the entire contents of which is incorporated herein by reference.

The contents of International patent application Nos. PCT/AU2020/051166, PCT/AU2020/051170, PCT/AU2020/051175, PCT/AU2020/051177 and PCT/AU2020/051178 are incorporated herein in their entireties by reference.

FIELD OF THE INVENTION

This invention relates to a generator. More particularly, but not exclusively, the invention relates to a remote control generator which may use an internal combustion engine, for example with multiple banks of cylinders, with improved efficiency.

BACKGROUND OF THE INVENTION

It is known to provide a generator powered by an internal combustion engine. Traditional conventional internal combustion engines use a crankshaft, crankpins and connecting rods. However the applicant has identified that there are limitations in noise, vibration, smoothness, efficiency and emissions of conventional internal combustion engines.

In traditional generators, the generator output is controlled by mechanical settings on the generator itself. The generator is originally configured as a 30 kW (eg) generator and that is the maximum output able to be provided. If the downstream demand exceeds this output, the generator is unable to keep up and may "trip-out". Many manufacturers use available off-the-shelf engines to power their generator sets. These engines are limited in power due to their physical size and package space. Owners are reluctant to purchase the next-size-up generator due to cost considerations and will risk trip-outs in favour of a lower initial purchase and install cost.

The applicant has determined that it would be beneficial for there to be provided a generator which overcomes or at least alleviates one or more disadvantages of existing generators. Accordingly, examples of the present invention seek to avoid or at least ameliorate the disadvantages of existing generators.

SUMMARY OF THE INVENTION

In accordance with one aspect of the present invention, there is provided a generator for providing electrical power, the generator being provided with a control unit for controlling the generator, wherein the generator includes a communication receiver such that the generator is able to be remotely controlled by instructions received by way of the communication receiver.

Preferably, the control unit includes the communication receiver.

Preferably, the generator has an internal combustion engine, including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft.

More preferably, the coupling is arranged such that the piston has sinusoidal motion for constant rotational velocity of the output shaft when plotted against rotational angle of the output shaft.

Preferably, the engine is in the form of an opposed cylinder engine. More preferably, the engine may be in the form of an engine with at least one pair of opposed cylinders having pistons movable along a common axis and connected by a unitary connecting rod. Even more preferably, the engine may be in the form of a scotch yoke engine.

In one form, the control unit is arranged to receive software updates via the communication receiver.

Preferably, the generator includes a communication transmitter. More preferably, the control unit is able to transmit data from the generator via the communication transmitter to a remote device for analysis of the data. Even more preferably, the data relates to maintenance, power usage and/or whether the generator is a correct size/capacity for the power usage.

In accordance with another aspect of the present invention, there is provided a generator having an internal combustion engine, including a plurality of pistons, a plurality of cylinders, and an output shaft, wherein the pistons are arranged for reciprocating motion within the cylinders, driven by combustion, and the pistons are coupled to the output shaft by a coupling such that said reciprocating motion of the piston drives rotation of the output shaft, wherein the engine includes a first cylinder bank and a second cylinder bank, wherein drive for a camshaft of the first cylinder bank from the output shaft is at one end of the output shaft, and wherein drive for a camshaft of the second cylinder bank from the output shaft is at an opposite end of the output shaft.

Preferably, the engine is in the form of an opposed cylinder engine.

In accordance with another aspect of the present invention, there is provided a generator having an internal combustion engine, the engine including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine includes an engine cylinder block formed as separable parts, being a crankcase and at least one cylinder block.

In accordance with another aspect of the present invention, there is provided a generator having an internal combustion engine, the engine including a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine includes a crankcase formed of a plurality of separable like parts, each of the like parts being cast as a common part.

Preferably, each of the like parts is an identical part.

In accordance with another aspect of the present invention, there is provided a method of supplying electrical power including the steps of: providing a plurality of generators rated at a first capacity but restricted to a second capacity, the second capacity being lower than the first capacity; leasing the generators to customers at a lease rate commensurate with the second capacity; selectively remotely derestricting the generators to operate at the first capacity and at a lease rate commensurate with the first capacity.

Preferably, the step of derestricting the generators is conducted in response to demand on the generator exceeding output of the generator.

Preferably, the step of derestricting the generators is conducted in response to customer request.

In a preferred form, a single generator is shared between multiple households.

Preferably, the method further includes the step of providing a remote master controller for controlling multiple generators in response to a master command.

BRIEF DESCRIPTION OF THE DRAWINGS

The invention is further described by way of non-limiting example only with reference to the accompanying drawings, in which:

FIG. 3 shows a method of supplying electrical power in accordance with an example of the present disclosure.

DETAILED DESCRIPTION

Figure 1:
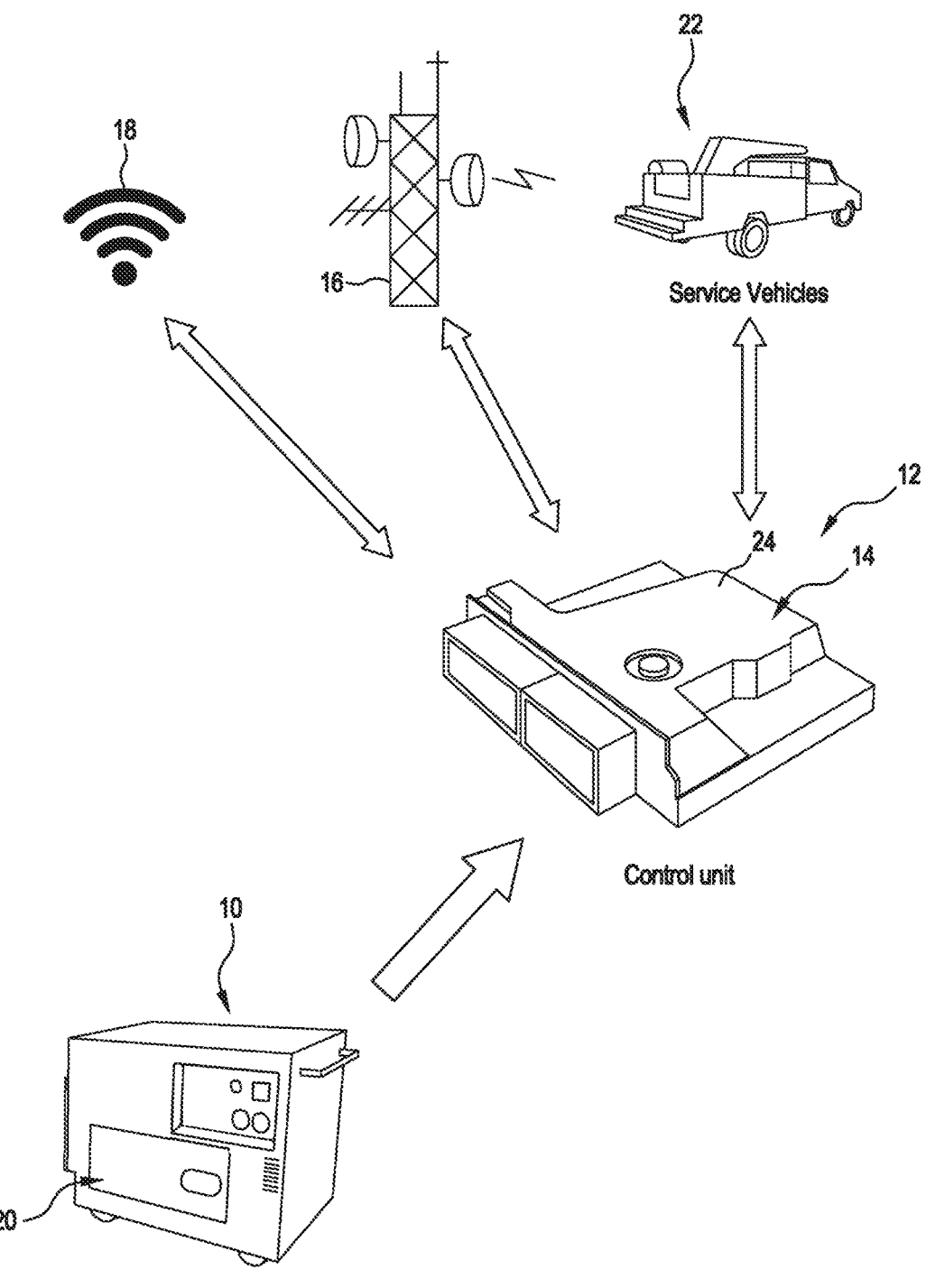
FIG. 1 shows a diagram depicting a generator in accordance with an example of the present invention.
Figure 2:
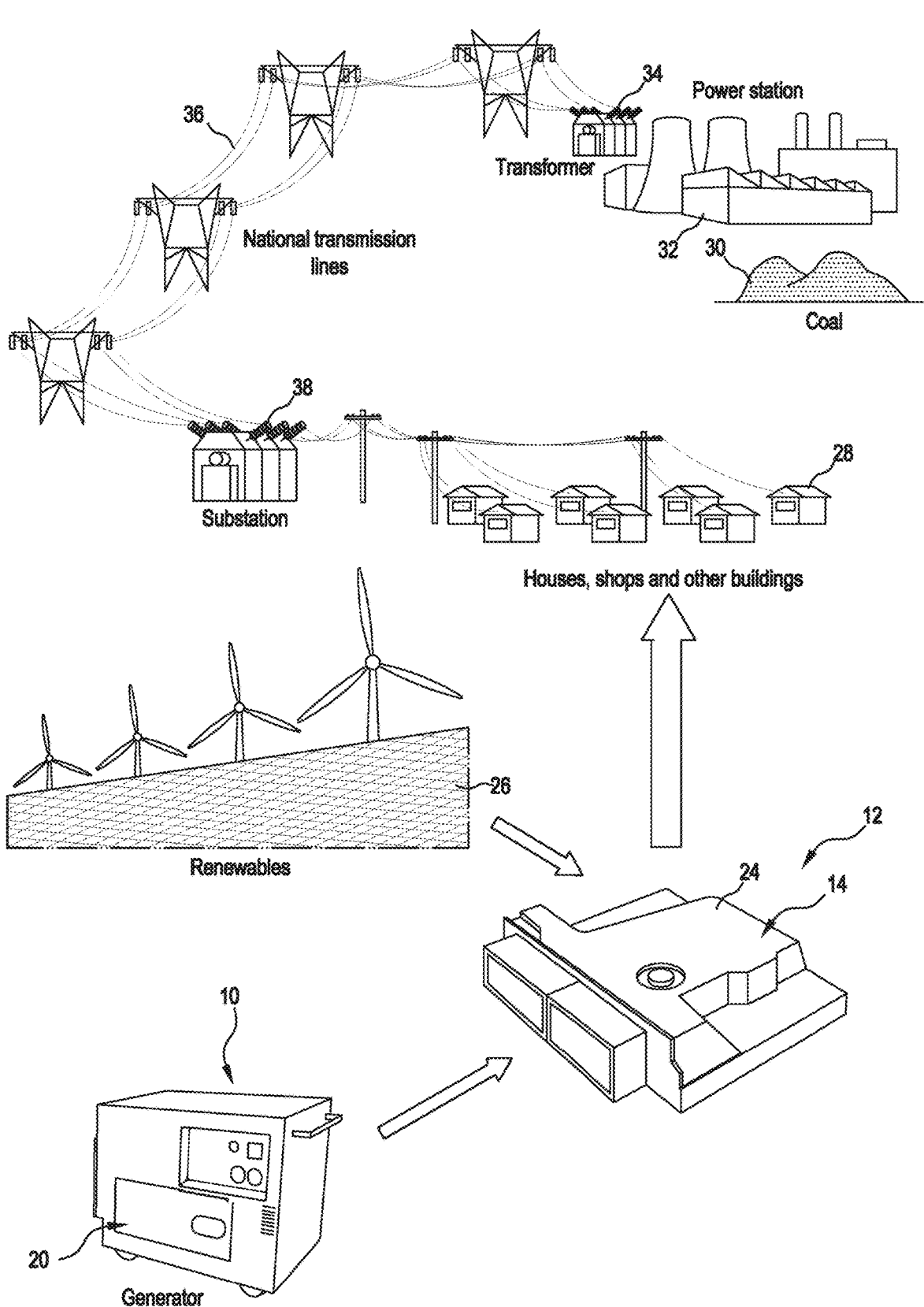
FIG. 2 shows a diagram depicting usage of a generator in accordance with an example of the present invention with other power sources.

As can be seen in FIGS. 1 and 2 of the drawings, the present invention may provide a generator having a control unit and a communication receiver (which may be part of the control unit) which enables the generator to be remotely controlled. The generator may also include a communication transmitter which enables remote monitoring of output of the generator and/or demand on the generator. Remote control of the generator may be useful for a range of functions including restricting capacity of the generator, derestricting capacity of the generator, remote start of the generator to circulate oil, as well as a range of other functions.

More specifically, as shown in FIG. 1 and FIG. 2, there is provided a generator 10 for providing electrical power, the generator 10 being provided with a control unit 12 for controlling the generator 10, wherein the generator 10 includes a communication receiver 14 such that the generator 10 is able to be remotely controlled by instructions received by way of the communication receiver 14.

The control unit 12 may includes the communication receiver 14. The communication receiver 14 may make use of Wi-Fi and/or cellular communications. In one form, the communication receiver 14 may be provided with its own Sim card for communication with a cellular tower 16 and/or a Wi-Fi receiver for communication with a Wi-Fi router 18.

The generator 10 may be provided with an internal combustion engine 20, including a piston, a cylinder, and an output shaft. The piston may be arranged for reciprocating motion within the cylinder, driven by combustion, and the piston may be coupled to the output shaft by a coupling such that the reciprocating motion of the piston drives rotation of the output shaft which, in turn, drives generation of electrical power for supply from the generator 10.

The coupling may be arranged such that the piston has sinusoidal motion for constant rotational velocity of the output shaft when plotted against rotational angle of the output shaft. The engine may be in the form of an opposed cylinder engine. More specifically, the engine may have at least one pair of opposed cylinders having pistons movable along a common axis and connected by a unitary connecting rod, such that both pistons move simultaneously in the same direction. In one particular example, the engine may be in the form of a scotch yoke engine. The engine may include one or more of the features disclosed in the applicant's own published International patent application numbers referred to at the beginning of this patent specification.

The control unit 12 may be arranged to receive software updates via the communication receiver such that software of the generator 10 can be kept up-to-date remotely. A service vehicle 22 may be used for delivering the generator 10 for installation and for providing service to the generator 10.

The generator 10 may include a communication transmitter 24. The communication transmitter 24 may include a Wi-Fi transmitter for communication with the Wi-Fi router 18 and/or a cellular transmitter for communication with the cellular communications tower 16. As will be appreciated by those skilled in the art, the generator 10 may include a communication transceiver which may be in the form of a Wi-Fi transceiver and/or a cellular transceiver. The control unit 12 may be able to transmit data from the generator 10 via the communication transmitter 24 to a remote device for analysis of the data. In one form, the data may relate to maintenance, power usage and/or whether the generator is a correct size/capacity for the power usage.

The internal combustion engine 20 may include a plurality of pistons, a plurality of cylinders, and an output shaft. In one form, the pistons are arranged for reciprocating motion within the cylinders, driven by combustion, and the pistons are coupled to the output shaft by a coupling such that the reciprocating motion of the piston drives rotation of the output shaft. In one example, the engine includes a first cylinder bank and a second cylinder bank, wherein drive for a camshaft of the first cylinder bank from the output shaft is at one end of the output shaft, and wherein drive for a camshaft of the second cylinder bank from the output shaft is at an opposite end of the output shaft. The engine may be in the form of an opposed cylinder engine.

Advantageously, the engine 20 may be in the form of an engine with at least one pair of opposed cylinders having pistons movable along a common axis and connected by a unitary connecting rod. Using an engine of this type for powering the generator 10 may be advantageous in providing a compact, low noise engine with low NVH operation. This type of engine may also provide advantages in relation to reducing emissions and reducing costs. The engine may run on a power source of petrol, LPG, methanol, ethanol, diesel, compressed natural gas, hydrogen or other suitable fuel. The fuel may be provided by way of a tank or piped. Furthermore, this type of engine may have a lubrication regime which allows the engine to run reliably at relatively higher speeds such as, for non-limiting example, 5,500 rpm. In addition, the applicant has identified that use of a linear bearing provides sinusoidal motion to the pistons over both TDC (top dead centre) and BDC (bottom dead centre).

In another form, the internal combustion engine 20 includes a piston, a cylinder, and an output shaft, wherein the piston is arranged for reciprocating motion within the cylinder, driven by combustion. The piston is coupled to the output shaft by a coupling such that said reciprocating motion of the piston drives rotation of the output shaft. The engine 20 includes an engine cylinder block formed as separable parts, being a crankcase and at least one cylinder block.

In yet another form, the engine 20 includes a crankcase formed of a plurality of separable like parts, each of the like parts being cast as a common part. Each of the like parts may be in the form of an identical part.

In another aspect and as illustrated in FIG. 3, there is provided an advantageous method of electrical power supply. In particular, there is provided a method of supplying electrical power including the steps of:

proviging (301) a plurality of generators 10 rated at a first capacity but restricted to a second capacity, the second capacity being lower than the first capacity;

leasing (303) the generators 10 to customers at a lease rate commensurate with the second capacity; and selectively remotely derestricting (305) the generators 10 to operate at the first capacity and at a lease rate commensurate with the first capacity.

The step of derestricting the generators may be conducted in response to demand on the generator 10 exceeding output of the generator 10. Alternatively or in addition, the step of derestricting the generators 10 may be conducted in response to customer request.

It is foreseen that a single generator 10 may be shared between multiple households.

The method may also include a step of providing a remote master controller for controlling multiple generators in response to a master command. For example, the master controller may be used for controlling the generators in a power outage event such as due to a bushfire or the like. The method of electrical power supply provided by the present invention may reduce costs for consumers insofar as avoiding the need to purchase a generator (which can be expensive) by instead leasing a generator for a regular leasing fee. Also, the ability of the generator to be remotely controlled may avoid tripping out of the generator (which may require resetting of a circuit breaker) as, with monitoring of the output and demand, the generator can be automatically adjusted to avoid tripping out. This may be achieved by way of changing the tuning of the internal combustion engine of the generator.

With reference to FIG. 1, the control unit 12 communicates with a remote facility over available/chosen connection method. Maintenance personnel can also interrogate the generator 10 via radio (or other) link whilst driving by without having to exit vehicle.

Turning to FIG. 2, there is shown an arrangement in which power is managed at a system level where demand and available sources are managed based on the best use case and lowest greenhouse gas emissions. Priority is given to certain systems based on local supply network, ie. solar first, coal fired grid last. The diagram shows a renewable energy source 26 as well as houses, shops and other buildings 28 supplied with power by the control unit 12. Also shown are coal piles 30 used in a coal power station 32, as well as a transformer 34, transmission lines 36 and a substation 38 for supply of electrical power generated by the power station 32.

In the arrangement shown in FIG. 2, the control unit 12 manages the power from available sources and determines how much power from each source is supplied and when each source is used. A controller at a remote location configures the control unit 12 and sets its control algorithms.

Examples of the present invention provide a method whereby the generator power can be regulated or controlled remotely. It also covers a means of communication between a monitoring station and the generator 10 itself whereby the engine power demand and output can be remotely monitored and configured to varying power output levels electronically rather than mechanically. Examples of the present invention may cover the following key areas:

The use of an engine 20 in a generator 10 where the power output can be monitored remotely Where the existing household (or other) Wi-Fi system can be used as the communication media Where the existing Cellular network can be used as the communication media Where a dedicated radio link can be used as the communication media Where a powerline modem can be used as the communication media Where a radio link can be used as the communication media Where a visual display can be used as the communication media Where the engine 20 power output can be monitored by the communication media Where the downstream power demand can be monitored via the communication media Where the power output of the generator 10 can be increased or decreased via the communication media Where the billing for the power used and rate per kWhr can be applied based on the information received over the communication media Where the engine 20 servicing requirements can be communicated and monitored using the communication media The result is:

Less cost for the owner as he/she is billed at market rate only for what is used Less cost for the installer as the system can be monitored and configured remotely Less maintenance cost as only essential maintenance is required (no over-servicing)

Ability to manage the power output based on system requirements

Ability for a one-size-fits-all approach to generator output for the installer

The ability to rerate the engine output based on demand history and then charge the owner accordingly The ability for the generator 10 to be reactive to the demand in peak periods The ability to bill a combination of rental plus real power usage rather than a rental based on generator size alone (that may be oversized for the application)

Less backup power trip outs

The ability to lease the generator 10 to a user rather than sell the generator 10 to them and then set charges based on rental plus usage The ability to integrate the generator 10 with other power supply devices (eg solar) and manage when the generator 10 does and does not start. ie it does not make sense for the generator 10 to start if the grid does down but the home solar system is keeping up with the demand Ability to reduce greenhouse gases generated by home generators starting up when not needed While various embodiments of the present invention have been described above, it should be understood that they have been presented by way of example only, and not by way of limitation. It will be apparent to a person skilled in the relevant art that various changes in form and detail can be made therein without departing from the spirit and scope of the invention. Thus, the present invention should not be limited by any of the above described exemplary embodiments.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

LIST OF FEATURES

10 Generator
12 Control unit
14 Communication receiver
16 Cellular communications tower
18 Wi-Fi router
20 Internal combustion engine
22 Service vehicle
24 Communication transmitter
26 Renewable energy source
28 Houses, shops and other buildings
30 Coal piles
32 Coal power station
34 Transformer
36 Transmission lines
38 Substation

The invention claimed is:

1. A generator for providing electrical power, the generator comprising an internal combustion engine and being provided with a control unit including a communication transmitter that allows for power output of the generator and a power demand on the generator to be remotely monitored, wherein the generator includes a communication receiver such that the power output of the generator is able to be remotely controlled, wherein the power output of the generator is able to be increased by changing a tuning of the engine according to instructions received by way of the communication receiver in response to the power demand on the generator exceeding the power output of the generator.

2. A generator as claimed in claim 1, wherein the control unit includes the communication receiver.

3. A generator as claimed in claim 1, the internal combustion engine including: a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft.

4. A generator as claimed in claim 3, wherein the coupling is arranged such that the piston has sinusoidal motion for constant rotational velocity of the output shaft when plotted against rotational angle of the output shaft.

5. A generator as claimed in claim 3, wherein the engine is in the form of an opposed cylinder engine.

6. A generator as claimed in claim 5, wherein the engine has at least one pair of opposed cylinders having pistons movable along a common axis and connected by a unitary connecting rod such that the pistons move simultaneously in the same direction.

7. A generator as claimed in claim 1, wherein the control unit is arranged to receive software updates via the communication receiver.

8. A generator as claimed in claim 1, wherein the control unit is able to transmit data from the generator via the communication transmitter to a remote device for analysis of the data.

9. A generator as claimed in claim 8, wherein the data comprises maintenance data, power usage data and/or other data indicative of whether the generator is a correct size/capacity for the power usage.

10. A generator as claimed in claim 1, the internal combustion engine including: a plurality of pistons, a plurality of cylinders, and an output shaft, wherein the pistons are arranged for reciprocating motion within the cylinders, driven by combustion, and the pistons are coupled to the output shaft by a coupling such that said reciprocating motion of the piston drives rotation of the output shaft, wherein the engine includes a first cylinder bank and a second cylinder bank, wherein drive for a camshaft of the first cylinder bank from the output shaft is at one end of the output shaft, and wherein drive for a camshaft of the second cylinder bank from the output shaft is at an opposite end of the output shaft.

11. A generator as claimed in claim 10, wherein the engine is in the form of an opposed cylinder engine.

12. A generator as claimed in claim 1, the internal combustion engine including: a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine includes an engine cylinder block formed as separable parts, being a crankcase and at least one cylinder block.

13. A generator as claimed in claim 1, the internal combustion engine including: a piston, a cylinder, and an output shaft, wherein the piston is arranged for reciprocating motion within the cylinder, driven by combustion, and the piston is coupled to the output shaft by a coupling such that said reciprocating motion of the piston drives rotation of the output shaft, wherein the engine includes a crankcase formed of a plurality of separable like parts, each of the like parts being cast as a common part.

14. An engine as claimed in claim 13, wherein each of the like parts is an identical part.

15. A method of supplying electrical power comprising:
providing a plurality of generators rated at a first power output capacity but restricted to a lower second power output capacity, each generator including an internal combustion engine, a control unit including a communication transmitter that allows for power output of the respective generator and a power demand on the respective generator to be remotely monitored, and a communications receiver such that the power output of the respective generator is able to be remotely controlled;
leasing the plurality of generators to customers at a lease rate commensurate with the second capacity; and
selectively remotely derestricting at least one of the plurality of generators to operate at the first capacity and at a lease rate commensurate with the first capacity by changing a tuning of the engine of the at least one generator in response to demand on the at least one generator exceeding output of the at least one generator.

16. A method of supplying electrical power as claimed in claim 15, wherein the step of derestricting the at least one of the plurality of generators is also conducted in response to customer request.

17. A method of supplying electrical power as claimed in claim 15, wherein a single generator is shared between multiple households.

18. A method of supplying electrical power as claimed in claim 15, further including providing a remote master controller for controlling multiple generators in response to a master command.

* * * * *